United States Patent [19]

Van Wijk

[11] 4,456,984

[45] Jun. 26, 1984

[54] MAGNETIC PICK-UP AND/OR CUTTER CARTRIDGE

[75] Inventor: Keimpe Van Wijk, Eindhoven, Netherlands

[73] Assignee: U.S. Philips Corporation, New York, N.Y.

[21] Appl. No.: 333,362

[22] Filed: Dec. 22, 1981

[30] Foreign Application Priority Data

Jan. 30, 1981 [NL] Netherlands ......................... 8100448

[51] Int. Cl.$^3$ ......................... G11B 3/00; H04R 11/12

[52] U.S. Cl. .................................... 369/170; 369/136; 369/146; 369/148; 29/602 R

[58] Field of Search ............... 369/136, 146, 148, 170; 29/602 R, 607; 72/379; 174/35 CE

[56] References Cited

U.S. PATENT DOCUMENTS

| | | | |
|---|---|---|---|
| 1,651,922 | 9/1925 | Hughes | 174/35 CE |
| 2,320,632 | 11/1939 | McMaster | 29/607 |
| 2,469,137 | 5/1949 | Strong | 73/654 |
| 2,652,521 | 8/1949 | Westphal | 174/35 CE |
| 3,575,034 | 4/1971 | Lightner | 72/379 |
| 4,031,335 | 6/1977 | Smit | 369/146 |
| 4,140,886 | 2/1979 | Itoh | 369/136 |
| 4,353,125 | 10/1982 | Itoh et al. | 369/146 |

FOREIGN PATENT DOCUMENTS 2603092 8/1977 Netherlands .

*Primary Examiner*—Gerald Goldberg
*Assistant Examiner*—Hezron Williams
*Attorney, Agent, or Firm*—David R. Treacy

[57] ABSTRACT

A magnetic cartridge such as a pick-up or cutter, whose magnetic circuits are at least partly hollow, the cavities extending mainly in the direction of the magnetic flux. Each magnetic circuit and in particular each polepiece is formed at least partly with a slot communicating with the cavity and extending substantially in the same direction. This reduces eddy-current losses in the magnetic circuit, thereby improving the treble reproduction of the pick-up.

7 Claims, 7 Drawing Figures

MAGNETIC PICK-UP AND/OR CUTTER CARTRIDGE

BACKGROUND OF THE INVENTION

The invention relates to a pick-up and/or cutter cartridge for scanning and/or cutting information in a track of a disk-shaped record carrier, comprising a stylus holder which carries a stylus at one end and is attached to an omnidirectionally pivotal movable element at its other end, and two magnetic circuits, one for each of two mutually perpendicular directions of oscillation, which magnetic circuits each comprise at least one pole-piece, each of which co-operate with the pivotal element.

Such a pick-up is known from British Pat. No. 1,505,884. The known pick-up has the disadvantage that its output signal suffers some loss of high-frequency signal components.

SUMMARY OF THE INVENTION

It is an object of the invention to provide a magnetic cartridge (as used herein, the term magnetic cartridge will be understood to refer both to pick-ups and cutters) which mitigates this loss. To this end the cartridge, according to the invention, is characterized in that the magnetic circuit contains one or more cavities which extend substantially in the direction of the magnetic flux or lines of force and the magnetic circuit has at least one slot which extends substantially in the direction of the magnetic lines of force.

The invention is based on the recognition that the loss of high-frequency signal components in the output signal is mainly caused by eddy-current losses in the magnetic circuit of the cartridge, the magnitude of the eddy-current losses being proportional to the square of the frequency. By applying the invention to the magnetic circuit and, in particular, to a polepiece, eddy currents, which are caused by variations of the magnetic field in the magnetic circuit and which mainly propagate in the part of the magnetic circuit lying close to the surface in a direction perpendicular to the direction of the magnetic lines of force, are reduced.

Another embodiment of the cartridge in accordance with the invention is characterized in that the slot (slots) extend (extends) into the cavity. This step leads to a further reduction of eddy currents and the consequent reduction of the loss of high-frequency signal components. Suitably, the slot (slots) is (are) made to coincide with the cavity, because this simplifies manufacture and is therefore cheaper.

A further embodiment of the cartridge in accordance with the invention is characterized in that the polepiece is made of a sheet material, the polepiece being obtained by mechanical deformation. This step has the advantage that the material costs for this embodiment are very low. Thus the polepiece may be stamped out of a flat sheet of a thin material and be mechanically deformed in such a way that the desired exterior shape of the polepiece is obtained. By the use of a sheet material a hollow polepiece is obtained which is formed with at least one slot which extends up to the cavity, so that a very high resistance to eddy currents is obtained.

Embodiments of the invention are described in more detail with reference to the drawing.

DESCRIPTION OF THE PREFERRED EMBODIMENTS

Figure 1A:
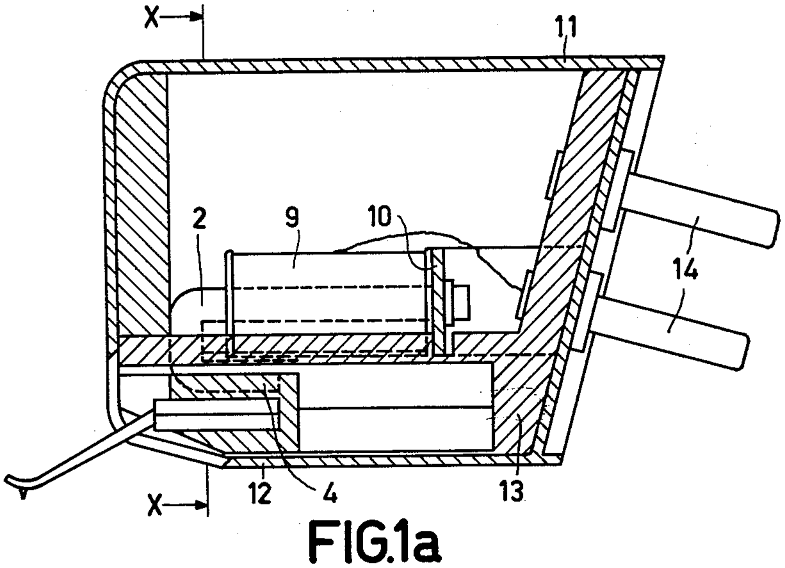
FIGS. 1*a* and 1*b* are sectional views of a cartridge in accordance with the invention.
Figure 1B:
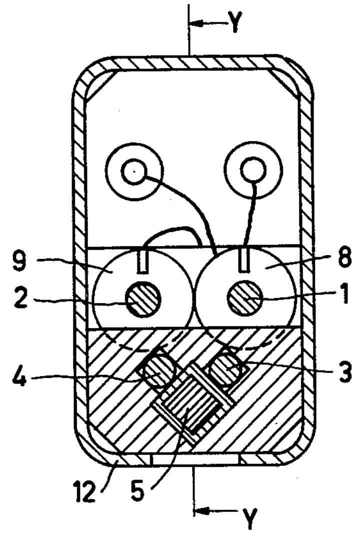

FIGS. 1*a* and 1*b* show a pick-up and/or cutter in accordance with the invention, FIG. 1*a* being a sectional view of the pick-up taken on the line Y—Y in FIG. 1*b* and FIG. 1*b* a sectional view of the pick-up taken on the line X—X in FIG. 1*a*.

The polepieces of the pick-up consists of U-shaped magnetic conductors 1 and 2, the one limb of each U, 3 and 4 respectively, cooperating with an omnidirectionally pivotal movable element 5 which is attached to one end of a stylus, holder whose other end carries a stylus and arranged on the other limb electric coils 8 and 9 which are cylindrical in this embodiment. The ends which cooperate with the movable element are located in recesses in a plastic block 13, while the coils 8 and 9 engage in grooves in that block. The ends of the limbs of the U-shaped round conductors 1 and 2 which do not cooperate with the movable element 5 are interconnected by a U-shaped yoke 10 of a magnetic material whose limbs are connected to the housing 11. The underside 12 of the housing 11, which consists of a soft-magnetic material, constitutes a third polepiece and is flat in this case. This third polepiece is common to both directions of oscillations. The two magnetic circuits, one for each of the two mutually perpendicular directions of oscillation, are now constituted by: the polepiece 1, the limb 3, the movable element 5, the underside 12 of the housing 11, the U-shaped yoke and the polepiece 1 and by the polepiece 2, the limb 4, the movable element 5, the underside 12 of the housing 11, the housing 11, the U-shaped yoke 10, and the polepiece 2 respectively. The connection pins 14 are mounted in the plastic block 13.

The movable element 5 is made of a permanent magnetic material, but it is alternatively possible to make this element of a soft magnetic material and to arrange a permanent magnet between the yoke 10 and the housing 11, or to make the yoke 10 of a permanent magnetic material.

The polepieces 1 and 2 need not necessarily be U-shaped, but may just as easily have a different shape. They may, for example, be Z-shaped. Furthermore, the idea of the invention is not limited to a pick-up as shown in FIG. 1, in which the magnetic circuit comprises only one pole piece for each direction of oscillation with the underside 12 of the housing 11 functioning as a common conductor for the magnetic flux in both circuits. It is equally possible to provide each magnetic circuit with two associated polepieces, which both cooperate with the movable element 5. The step in accordance with the invention, which in fact may also be applied to other parts of the magnetic circuit, will be explained by means of a number of examples shown in FIGS. 2 to 6. These Figures show some polepieces to which the step in accordance with the invention has been applied.

Figure 2:
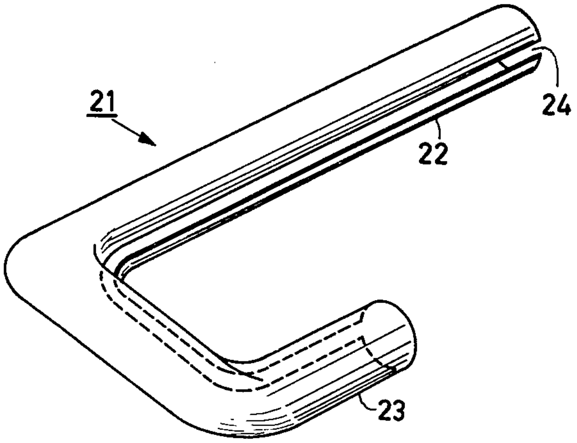
FIG. 2 shows a hollow polepiece formed with a slot.

FIG. 2 shows a hollow polepiece 21, whose limb 22 cooperates with the coil 8 or 9 of FIG. 1. The other limb 23 of the polepiece cooperates with the movable element 5 of FIG. 1. The polepiece is formed with a slot 24 which extends over the entire length of the polepiece. It need not necessarily extend up to the cavity although this is desirable for an optimum effect. The polepiece of FIG. 2 has a slot which does extend up to the cavity. The polepiece of FIG. 2 can for example be obtained by a mechanical operation, such as stamping and folding, so that ultimately a slit tube is obtained.

Figure 3:
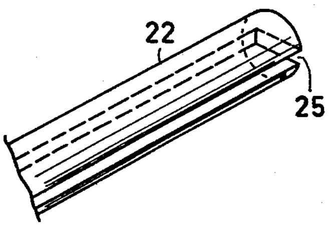
FIG. 3 shows a part of another hollow polepiece formed with a slot.

FIG. 3 shows a part of the limb 22 of another polepiece having a slot 25, which may be formed in the solid rod, for example by cutting, before it is bent into the U or Z-shape. Thus the slot and the cavity then coincide.

Figure 4:
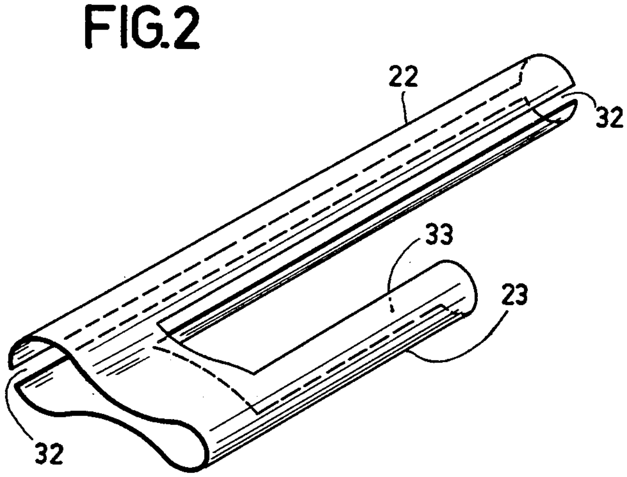
FIG. 4 shows a hollow polepice formed with a slot which extends up to the cavity, which polepiece can be obtained from a sheet of a thin material.
Figure 6:
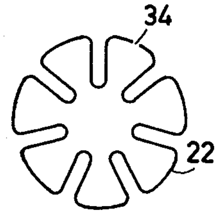
FIG. 6 is a sectional view of a different polepiece in accordance with the invention.
Figure 5:
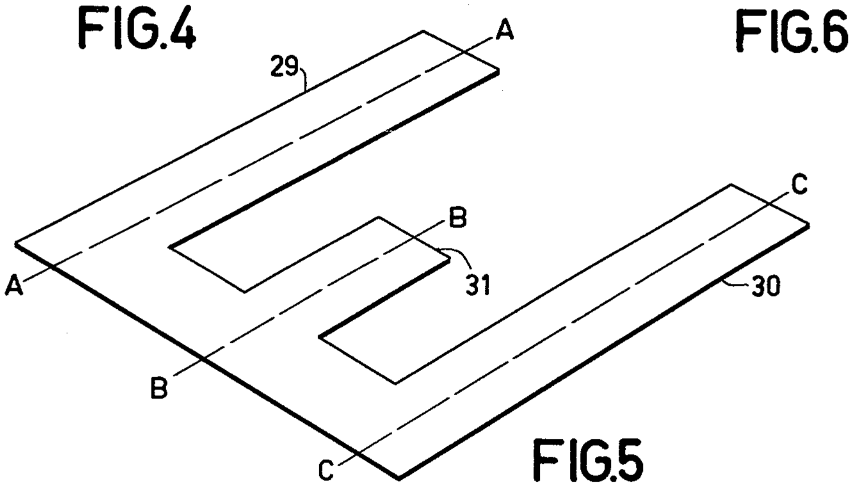
FIG. 5 shows the sheet of a thin material from which the polepiece of FIG. 4 can be obtained by bending the sheet.

FIG. 4 shows yet another polepiece, made of a thin flat sheet, whose development is shown in FIG. 5. The polepiece of FIG. 4 is obtained by bending the sheet of FIG. 5 along the lines A—A, B—B and C—C. The portions 29 and 30 in FIG. 5 then constitute the limb 22 of FIG. 4, which is hollow and formed with two slots 32 which extends in the longitudinal direction of the limb. The portion 31 in FIG. 5 constitutes the limb 23, which is formed with a slot 33 on one side only.

It is to be noted that the invention is not limited to polepieces of the shapes shown here, but that the invention is equally applicable to polepieces whose shapes differ from those of the polepieces shown with respect to points which are not relevant to the invention. An example of this is the polepiece of FIG. 6, of which only one limb is shown in sectional view, which polepiece is also made of a thin sheet material and is formed with a slot 34.

What is claimed is:

1. A magnetic cartridge for information in a track of a disc-shaped record carrier, comprising a stylus holder which carries a stylus at one end and is attached to an omnidirectionally pivotal movable element at its other end; two electric coils; two magnetic circuits, one for each of two mutually perpendicular directions of pivotal oscillation, which magnetic circuits each comprise at least one polepiece, each polepiece cooperating with said pivotal element, each circuit extending from the pivotal element to a respective electric coil; and means for producing a respective magnetic flux in each circuit corresponding to the pivotal oscillations, characterized in that each magnetic circuit comprises a hollow magnetic conductor having a length, elongated in the direction of the magnetic flux, the hollow conductor defining at least one cavity which extends substantially in the direction of the magnetic flux, and each magnetic conductor has at least one slot which communicates with the respective cavity and extends the length of the conductor substantially in the direction of the magnetic flux.

2. A cartridge as claimed in claim 1, characterized in that each slot and respective cavity coincide.

3. A cartridge as claimed in claim 1 characterized in that each slot extends into the respective cavity.

4. A cartridge as claimed in claim 3, characterized in that each slot and respective cavity coincide.

5. A cartridge as claimed in claim 3, characterized in that each magnetic conductor forms a respective polepiece and is made of a sheet material surrounding said cavity.

6. A cartridge as claimed in claim 1, characterized in that each magnetic conductor forms a respective polepiece and is made of a sheet material surrounding said cavity.

7. A cartridge as claimed in claim 6, characterized in that each polepiece is a U-shaped magnetic conductor formed from a single sheet of material bent about a plurality of axes, all of said axes being parallel to each other.

* * * * *